United States Patent [19]

Yamada et al.

[11] Patent Number: 4,842,951

[45] Date of Patent: Jun. 27, 1989

[54] THERMOFORMING RESIN LAMINATE SHEET

[75] Inventors: Toyokazu Yamada, Himegi; Masao Miyama, Sodegaura; Hideo Sugimura; Takeshi Shinohara, both of Himegi, all of Japan

[73] Assignee: Idemitsu Petrochemical Company Limited, Tokyo, Japan

[21] Appl. No.: 137,627

[22] Filed: Dec. 24, 1987

Related U.S. Application Data

[63] Continuation-in-part of Ser. No. 867,982, May 29, 1986, abandoned.

[30] Foreign Application Priority Data

Jun. 5, 1985 [JP] Japan .................................. 60-122257

[51] Int. Cl.4 .............................................. B32B 27/68
[52] U.S. Cl. .............................. 428/516; 156/244.11; 264/544; 428/688
[58] Field of Search ................ 264/544; 428/688, 35, 428/518, 516, 349, 520

[56] References Cited

U.S. PATENT DOCUMENTS

| | | | |
|---|---|---|---|
| 4,360,550 | 11/1982 | Asakura et al. | 428/35 |
| 4,379,188 | 4/1983 | Zimmerman et al. | 428/442 |
| 4,559,266 | 12/1985 | Misasa et al. | 428/516 |
| 4,561,920 | 12/1985 | Foster | 428/35 |
| 4,567,089 | 1/1986 | Hattori et al. | 428/516 |
| 4,572,854 | 2/1986 | Dallmann et al. | 428/35 |
| 4,578,296 | 3/1986 | Miyazuki et al. | 428/516 |
| 4,610,914 | 9/1986 | Newsome | 428/35 |
| 4,615,922 | 10/1986 | Newsome | 428/35 |
| 4,652,489 | 3/1987 | Crass et al. | 428/447 |
| 4,666,772 | 5/1987 | Schink et al. | 428/349 |

Primary Examiner—Edith Buffalow
Attorney, Agent, or Firm—Armstrong, Nikaido, Marmelstein, Kubovcik & Murray

[57] ABSTRACT

A resin laminate is disclosed, which comprises a gas permeation-resistant resin layer having laminated on each side thereof a polyolefin based resin layer, wherein said polyolefin based resin layer contains an inorganic filler in an amount of 30 to 80% by weight based on the total weight of the resin composition. The resin laminate may be provided with a thermoplastic resin layer containing no inorganic filler on the outersurface thereof. The resin laminate has a minimized oxygen gas permeability and has a low calorific value and is useful as a packaging material.

4 Claims, 1 Drawing Sheet

THERMOFORMING RESIN LAMINATE SHEET

This application is a continuation-in-part of application Ser. No. 867,982, filed May 29, 1986 and now abandoned.

FIELD OF THE INVENTION

The present invention relates to a thermoforming resin laminate sheet and more particularly it relates to a thermoforming resin laminate sheet which comprises a specific polyolefin based resin layer containing a specific amount of an inorganic filler and a specific polyolefin based resin layer free from inorganic filler which sandwich therebetween a gas permeation-resistant resin layer and which is suitable for production of packaging containers for various foods, beverages and medicines.

BACKGROUND OF THE INVENTION

Various materials have heretofore been used as a packaging material for food products, beverages, medicines. For example, paper, synthetic resin sheets or films, laminates of paper and a synthetic resin sheet or film, etc. are used. Among them, packaging materials composed of a synthetic resin, particularly polyolefin sheets or films have excellent molding characteristics, high productivity, resistance to water and chemicals, etc. and therefore have been widely used in many fields of industry.

However, polyolefin sheets or films, which are highly resistant to water vapor transmission, have only a poor resistance to permeation of gases, for example, oxygen gas, and as a result even when products or articles such as food products, machines, etc. are packaged with a polyolefin sheet or film, the covered product or article suffers various problems such as oxidation or deterioration, or generation of rusts by the action of oxygen which permeates the sheet or film.

In order to solve these problems, it has conventionally been proposed to use a laminate material composed of a polyolefin sheet or film and a sheet or film of a resin which is resistant to gas permeation such as nylon, an ethylene-vinyl alcohol copolymer, etc.

However, such laminate materials releases a high exothermic energy upon burning, and they tend to give damages to incinerators when they are incinerated. Therefore, it is disadvantageous to employ such laminate materials in the field of industry where they are used in large amounts.

Moreover, containers molded from such laminate materials are insufficient in stiffness, heat resistance, etc. and therefore it is difficult to use such laminate materials as a forming material for producing containers for retort food products.

U.S. Pat. No. 4,572,854 discloses a multilayer film which comprises:

(a) an inner barrier layer D comprised of a saponified ethylenevinyl alcohol copolymer which contains about 15 to about 60 mole % ethylene units and which is saponified to at least approximately 90%, said inner barrier layer presenting a first surface and a second surface;

(b) on at least one of said first and second surfaces, an adhesion-promoting layer C comprised of a modified polyolefin; and (c) adjacent to said adhesion-promoting layer, a layer B comprised of at least one polymer selected from the group consisting of a polypropylene homopolymer, a propylene copolymer, and said modified polyolefin, wherein all of the layers of said multilayer film are coextruded to form a multilayer composite, which is then biaxially oriented under substantially the same stretching conditions to form said multilayer film.

Said U.S. patent discloses a 4-unit, 7-layered film which comprises an inner barrier layer D, an adhesion-promoting layer C on the surface of the layer D, a polymer layer B comprised of a propylene homopolymer or propylene copolymer having a melting point of about 140° C. or higher and a sealable layer A and further discloses that said polymer B may contain titanium dioxide, calcium carbonate and silicon dioxide as a pigment and said sealable layer A may contain a lubricant, an anti-blocking agent, etc.

However, the multilayer film disclosed in said U.S. patent is a film coextruded and then biaxially oriented and its thickness is very thin, 10-100 μm. Therefore, this patent relates to a high strength film having gas barrier property and moisture resistance and it is almost impossible to form containers from this film by thermoforming due to orientation of the film. Even if this film is formed into a container, the obtained container is insufficient in strength and stiffness and cannot be used as a container.

Moreover, the polymer layer B of said multilayer film may contain calcium carbonate, etc., but this calcium carbonate is added as a pigment and its amount is 1-25% by weight and is not used for increasing mechanical strength of the multilayer film.

If calcium carbonate is contained in an amount much greater than 25% by weight in said polymer layer B and they are coextruded and biaxially oriented, the resulting multilayer film becomes porous and cannot be a gas-permeation resistant or moisture resistant film and furthermore cannot be thermoformed into a container.

SUMMARY OF THE INVENTION

An object of the present invention is to provide a thermoforming resin laminate sheet for obtaining containers low in permeability to gas such as oxygen gas and superior in moisture resistance, heat resistance, strength, stiffness and the like.

Another object of the present invention is to provide a thermoforming resin laminate sheet which can be used for packaging various products or articles with preventing the covered goods from being oxidized and which can also be used as a material for producing package containers for retort food products.

Still another object of the present invention is to provide a thermoforming resin laminate sheet having a low calorific value.

As a result of extensive research, it has now been found by the present inventors that a thermoforming resin laminate sheet comprising a set of polyolefin based resin layers containing a specified amount of an inorganic filler sandwiching therebetween a gas permeation-resistant resin layer meets the above-described objects and thus the present invention has been attained.

Therefore, the present invention provides a resin laminate sheet comprising:

(a) a gas permeation-resistant resin layer;
(b) on each side of the gas permeation-resistant resin layer, a polyolefin based resin layer laminated on the gas permeation-resistant layer through an adhesive layer, said polyolefin based resin layer comprising a mixture of 30-80% by weight, based on the weight of the mixture, of at least one inorganic filler selected from the group consisting of talc and calcium carbonate and at least one resin selected from the group consisting of a polypropylene resin, a mixture of a polypropylene resin and an ethylene-propylene elastomer, and a mixture of a polypropylene resin and a polyethylene resin;

(c) on the outer surface of each polyolefin based resin layer, a thermoplastic resin layer free from inorganic filler and laminated on the outer surface of the polyolefin based resin layer, said thermoplastic resin being selected from the group consisting of a polypropylene resin, and a mixture of a polypropylene resin and a polyethylene resin.

DETAILED DESCRIPTION OF THE INVENTION

Figure 1:
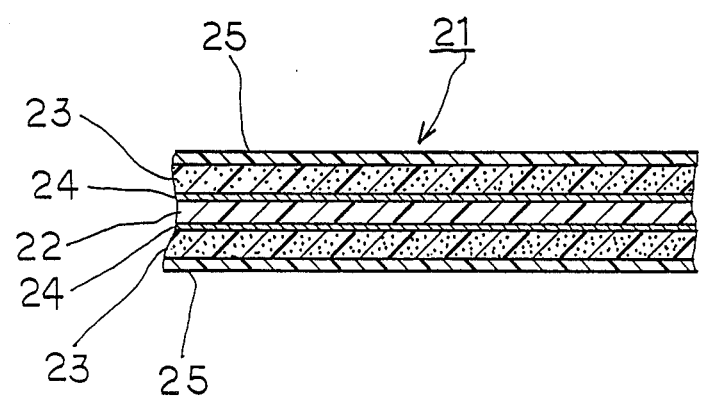
FIG. 1 is schematic longitudinal sectional views of an embodiment of the present invention.

As shown in FIG. 1, according to the present invention, said gas permeation-resistant resin layer 22 has on both surfaces polyolefin based resin layers 23 containing a specific inorganic filler through adhesive layers 24 and further polyolefin based resin layers 25 containing substantially no inorganic filler on both surfaces of layers 23.

Any resin that has a low permeability to at least oxygen and is capable of being molded into a desired shape can be used as the gas permeation-resistant resin. Examples of the gas permeation-resistant resin which can be used in the present invention include polyvinyl chlorides, polyvinylidene chlorides, halogen-containing polyethylenes such as poly(chlorotrifluoroethylene)s, etc., ethylene-vinyl alcohol copolymers (polymers obtained by saponifying ethylene-vinyl acetate copolymers), polyamides such as nylon-6, nylon-11, nylon-12, nylon-66, nylon-610, etc., polyacrylonitrile, polyesters such as mylar (du Pont), etc. Of these, polyvinylidene chlorides and ethylene-vinyl alcohol copolymers are preferred and ethylene-vinyl alcohol copolymers having an ethylene content of 20 to 60 mol % are more preferred.

Thickness of said gas permeation-resistant resin layer is normally 5–100 μm, preferably 10–60 μm.

As the inorganic filler contained in said polyolefin based resin layer, either calcium carbonate or talc may be used alone or they may be used in combination.

When carbon black, graphite, carbon fiber, etc. are used together with said inorganic fillers, light shielding property of the thermoforming resin laminate sheet can be improved. Thus, food products, pharmaceuticals and the like wrapped with this thermoforming resin laminate sheet can be prevented from deterioration by light, resulting in that prolonged storage can be achieved.

The above-described inorganic filler can be of any shape such as granular, plate crystal, fibrous, etc. as long as it has a particle size of not more than 20 micrometers, preferably not more than 15 micrometers, and more preferably not more than 5 micrometers.

As said polypropylene resins, mention may be made of polypropylenes such as isotactic polypropylene, syndiotactic polypropylene, atactic polypropylene and the like. As said polyethylene resins, mention may be made of polyethylenes such as high-density polyethylene, medium- and low-density polyethylenes, straight chain low-density polyethylene and the like.

Said ethylene-propylene elastomers include EPR, EPDM and the like.

Further, modified polyolefins can be used as the polyolefin contained as a base polymer in the polyolefin based resin layer. Suitable examples of modified polyolefin include polyolefins chemically modified with an unsaturated carboxylic acid (inclusive of anhydride thereof) or a derivative thereof.

Upon modification of the polyolefin, an elastomer such as a polybutadiene can be added to the reaction mixture. When preparing such chemically modified polyolefins, a polyolefin such as a polypropylene and an unsaturated carboxylic acid or derivative thereof can be reacted in the presence of a free radical initiator.

Among the various polyolefins described above, polyethylenes, polypropylenes, polybutene-1, and polymethylpenten-1 are preferred, and more preferred are polypropylenes, and blends of a polypropylene and a polyethylene.

In the present invention, it is essential that the polyolefin based resin layer contains the inorganic filler in an amount of 30–80% by weight, preferably 35–70% by weight. When the content of the inorganic filler is less than 30% by weight, not only heat resistance and mechanical strength are decreased but also the polyolefin based resin layer has a high heat of combustion which will include damages or disorder of incinerators. On the other hand, with the content of the inorganic filler being more than 80% by weight, the polyolefin based resin layer suffers decrease in the mechanical strength, moldability thermoformability.

If desired, the polyolefin based resin layer can contain various additives in suitable amounts as long as they do not adversely affect the properties of the resulting resin laminate of the present invention. Examples of such additives include coloring agents such as sparingly soluble azo dyes, red color forming coloring agent, cadmium yellow, cream yellow, titanium white, etc., antioxidants such as triazole based antioxidant, salicylic acid based antioxidant, acrylonitrile based antioxidant, ets., plasticizers such as phthaloyl diesters, butanol diesters, phosphoric diesters, etc., heat stabilizers, and the like.

Thickness of each of said polyolefin based resin layers is normally 50–200 μm, preferably 80–½μm and thickness of both layers may be different from each other.

Said adhesive layer may comprise, for example, said modified polyolefins (Explanation thereon is omitted here because these are previously explained hereabove), ionomer resins, ethylene-vinyl acetate copolymers, mixtures of the gas permeation-resistant resins used for formation of said gas permeation-resistant resin layer and/or said base polymer for said polyolefin based resin layer with one or two or more of said modified polyolefin, said ionomer resin and ethylene-vinyl acetate copolymer.

In case said mixtures are used as the adhesive, amount of the modified polyolefin, ionomer resin or ethylene-vinyl acetate copolymer is desirably 0.1–30% by weight, preferably 0.5–20% by weight of the gas permeation-resistant resin and/or the polyolefin based resin.

Thickness of the adhesive layer is usually 5–60 μm.

As shown in FIG. 1, according to the present invention, on both surfaces of said gas permeation-resistant resin layer 22 are laminated polyolefin based resin layers 23 containing a specific inorganic filler through adhesive layer 24 and furthermore, on the outer surfaces of the layers 23 are laminated resin layers 25 containing substantially no inorganic filler and comprising at least one resin selected from the group consisting of polypropylene resin and a mixture of polypropylene resin and polyethylene resin.

As the polypropylene resin and the polyethylene resin in said outermost resin layer, there may be used the same resins as used in said polyolefin based resin layers.

When the thermoplastic resin layers containing no inorganic filler are provided as third layers on the outer surfaces of the resin laminate, surface properties such as strength, glossiness, abrasion resistance, etc., printability and solvent resistance can be improved.

Said thermoforming resin sheet can be thermoformed by coextrusion method such as T-die extrusion, extrusion laminating method and the like.

The multilayer resin material for packaging containers of the present invention has a thickness of normally 200–2,000 μm, preferably 300–2,000 μm.

When the thickness is less than 200 μm, even if the sheet can be thermoformed into a packaging container, the container obtained is inferior in strength and stiffness and is not suitable for practical use and when more than 2,000 μm, thermoforming into a container often becomes difficult.

This thermoforming resin laminate sheet can be formed into containers by thermoforming such as vacuum forming, pressure forming and the like. For forming into deep-drawn containers, plug-assist thermoforming method is employed.

According to the present invention, the following effects are attained.

(1) Since this thermoforming resin laminate sheet is low in gas-permeability and high in moisture impermeability and mechanical strengths such as stiffness and besides superior in formability, this can be suitably used as a thermoforming sheet for packaging containers which attains prevention of oxidation and deterioration of packaged goods and prevention of rusting.

(2) Since this thermoforming resin laminate sheet has a polyolefin based resin layer containing 30–80% by weight of an inorganic filler, this sheet has heat resistance and has reduced burning calories and thus is suitable for containers for retort foods and furthermore, incinerators are not damaged by burning of wasted containers therein.

EXAMPLE 1

A material for a gas permeation resistant layer was prepared by extrusion molding an ethylene-vinyl alcohol copolymer (Eval EP-F101, a trade name for product by kuraray Co., Ltd.; ethylene content: 32 mol%, melt index: 1.3 g/10 min.) using a 30 mmφ extruder. A material for an adhesive layer was prepared by extrusion molding a polypropylene modified with maleic anhydride (Idemitsu Polytac, a trade name for a product by Idemitsu Petrochemical Co., Ltd.) using a 30 mmφ extruder. A material for a polyolefin based resin layer was prepared by extrusion molding a polypropylene (Idemitsu Polypro E-100G, a trade name for a product by Idemitsu Petrochemical Co., Ltd.; melt index: 0.6 g/10 min.) containing talc (average particle size: 14 μm) in an amount of 60% by weight based on the total weight of the resin composition using a 65 mmφ extruder. Further, a material for an outermost polyolefin layers containing no inorganic filler was prepared by extrusion molding a polypropylene resin (Idemitsu Polypro E-100G, a trade name for product by Idemitsu Petrochemical Co., Ltd.) containing no inorganic filler using a 50 mmφ extruder. These materials were coextruded so that these polyolefin layers containing no inorganic filler constitute the both outer surfaces to obtain a thermoforming resin laminate sheet.

This sheet was a 4-unit, 7-layered resin laminate sheet of 0.8 mm thick (having a symmetric construction: thermoplastic resin layer/polyolefin based resin layer/adhesive layer/gas permeation resistant resin layer/adhesive layer/polyolefin based resin layer/thermoplastic resin layer) (FIG. 1). The ratio of thickness of gas permeation resistant resin layer/adhesive layer/polyolefin based resin layer/polyolefin layer was 2:2:42:5.

The thermoforming resin laminate sheet was evaluated for Olsen stiffness, oxygen gas permeability, and calorific value as indicated below.

Olsen Stiffness:

This was determined according to the method described in ASTM-D747.

Oxygen Gas Permeability:

This was determined according to the method described in ASTM-D1434.

Calorific Value:

This was determined according to the method described in JIS-K2279.

The results obtained are shown in Table 1.

COMPARATIVE EXAMPLE 1

A single layer sheet of 0.8 mm thick was prepared using the same polypropylene as that used in Example 1 for the thermoplastic resin layer, and the Olsen stiffness, oxygen gas permeability and calorific value thereof were determined in the same manner in Example 1.

The results obtained are shown in Table 1.

COMPARATIVE EXAMPLE 2

A single layer sheet of 0.8 mm thick was prepared using the same talc-containing polypropylene as that used in Example 1 for the polyolefin based resin layer, and the Olsen stiffness, oxygen gas permeability and calorific value thereof were determined in the same manner in Example 1.

The results obtained are shown in Table 1.

COMPARATIVE EXAMPLE 3

The procedures in Example 1 were repeated except that the ethylene-vinyl alcohol copolymer layer and the modified polypropylene layer were omitted to obtain a 2-unit layer, 3-layered laminate sheet of 0.8 mm thick having a symmetric construction of thermoplastic resin layer/polyolefin based resin layer/thermoplastic resin layer with a thickness ratio of 5:90:5, and the Olsen stiffness, oxygen gas permeability and calorific value thereof were determined in the same manner as in Example 1.

The results obtained are shown in Table 1.

EXAMPLE 2

A material for a gas permeation resitant layer was prepared by extrusion molding an ethylene-vinyl alcohol copolymer (Soanol ET, a trade name for a product by Nippon Gosei Kagaku K.K.; ethylene content: 38 mol%, melt index: 1.4 g/10 min.) using a 30 mmφ extruder. A material for an adhesive layer was prepared by extrusion molding the same maleic anhydride-modified polypropylene as in Example 1 30 mmφ extruder. A material for a polyolefin based resin layer was prepared by extrusion molding a polyolefin containing talc (average particle size: 14 μm) in an amount of 50% by weight based on the total weight of the resin composition, which was a mixed resin composed of 95% by weight of the same polyolefin resin as used in Example 1 and 5% by weight of an ethylene-propylene elastomer (density: 0.86 g/cm$^3$, melt index (230° C.): 3.6 g/10 min., propylene content: 22% by weight, Mooney viscosity (ML$_{1+4}$100° C.): 20) using a 65 mmφ extruder. Further, a material for an outermost polyolefin layer containing no inorganic filler was prepared by extrusion molding a polypropylene (Idemitsu Polypro F200 S, a trade name for product by Idemitsu Petrochemical Co., Ltd.; melt index: 2 g/10 min.) using a 50 mmφ extruder. These materials were coextruded using a feed block to form a 4-unit layer, 7-layered thermoforming resin laminate sheet of 0.8 mm thick. The layer construction of the laminate was polypropylene layer (A)/talc-containing resin layer (B)/modified polypropylene layer (C)/ethylene-vinyl alcohol copolymer layer (D)/(C')/(B')/(A'). and the thickness ratio of the layers was 5:41.5:2:3:2:41.5:5.

The thermoforming resin laminate sheet was evaluated for various properties and the results obtained are shown in Table 2.

EXAMPLE 3

The procedures in Example 2 were repeated except that the resin composition for the outermost layers (A,A') was replaced by a mixed resin composed of 40% by weight of the same polypropylene as used in Example 1 and 60% by weight of a high density polyethylene (Idemitsu Polyethy 520 B, a trade name for a product by Idemitsu Petrochemical Co., Ltd.; density: 0.964 g/cm$^3$, melt index: 0.4 g/10 min.). The properties of the thermoforming resin laminate sheet were determined and the results obtained are shown in Table 2.

EXAMPLE 4

The procedures in Example 3 were repeated except that the mixed resin for the outermost layers (A,A') was used as a resin composition for the talc-containing resin layers (B,B') to form a thermoforming resin laminate sheet. The properties of the thermoforming resin laminate sheet were determined and the results obtained are shown in Table 2.

COMPARATIVE EXAMPLE 4

The procedures in Example 4 were repeated except that the modified polypropylene and ethylene-vinyl alcohol copolymer were not used to form a 2-unit layer, 3-layered thermoforming resin laminate sheet of 0.8 mm thick having a construction of (A)/(B)/(A'). The thickness ratio of the layers was 5:90:5.

The properties determined are shown in Table 2.

EXAMPLE 5

The procedures in Example 2 were repeated except that talc having an average particle size of 2 μm was used. Microscopic observation of the cross section of the thermoforming resin laminate sheet obtained revealed that the resin laminate sheet of this example has a very smooth interface between the talc-containing resin layer and the modified polypropylene layer a compared with the resin laminate sheet obtained in Example 2, and no adverse influence on the ethylene-vinyl alcohol copolymer layer was observed.

EXAMPLE 6

The procedures in Example 2 were repeated except that the talc was replaced by calcium carbonate having an average particle size of 4 μm to obtain a thermoforming resin laminate sheet.

EXAMPLE 7

The thermoforming resin laminate sheet as obtained in Example 4 was pressure thermoformed into a cup diameter of the opening: 75 mm, diameter of the bottom: 50 mm, height: 80 mm). Although it was deep drawn, the container had a good wall thickness distribution and a paper-like feeling. The cup showed an oxygen gas permeability of 0.03 cc/package·24 hours and a water vapor transmission of 0.02 cm$^3$/package·24 hours.

Although the present invention has been described with preferred embodiments, it is to be understood that variations and modifications may be employed as will be apparent to those skilled in the art. Such variations and modifications are to be considered within the purview and scope of the claims appended hereto.

TABLE 1

|  | Olsen Stiffness (kg/cm$^2$) | Oxygen Gas Permeability (ml/m$^2$·24 hrs/atm 23° C., 0% RH) | Calorific Value (cal/g) |
|---|---|---|---|
| Ex. 1 | 12000 | 1.0 | 5300 |
| C. Ex. 1 | 9500 | 350 | 11000 |
| C. Ex. 2 | 13500 | 400 | 4300 |
| C. Ex. 3 | 12500 | 380 | 5300 |

TABLE 2

| | Modulus of Elasticity MD/TD (Kg/mm) | Yield Strength MD/TD (Kg/cm$^2$) | Tensile Strength MD/TD (Kg/cm$^2$) | Elongation MD/TD (%) | Olsen Stiffness (Kg·mm) | Tensile Properties duPont Impact Strength*1 −20/23° C.) (Kg·cm) | Tensile Impact Strength*2 MD/TD (Kg-cm/cm$^2$) | Oxygen permeability (ml/m$^2$, 24 h 23° C., 0% RH) | Water*3 transmission (g/m$^2$, 24 h 40° C., 90% RH) | Vicat*4 softening point (°C.) |
|---|---|---|---|---|---|---|---|---|---|---|
| Ex. 3 | 213/182 | 270/240 | 250/230 | 11/9.8 | 156/137 | 2.6/18.5 | 70/66 | 0.7 | 0.7 | 144 |
| Ex. 2 | 203/175 | 270/230 | 260/220 | 66/6.3 | 159/141 | 3.2/20.0 | 78/65 | 2.6 | 0.4 | 132.5 |
| Ex. 5 | 238/224 | 280/260 | 260/250 | 4.6/3.3 | 160/171 | 1.5/11.7 | 63/60 | 1.2 | 0.2 | 130 |
| C. Ex. 4 | 242/211 | 260/240 | 250/240 | 2.4/2.1 | 152/151 | 1.1/3.0 | 45/44 | 27 | 0.4 | 129.5 |

*1 Determined using a duPont Impact Tester manufactured by Toyo Tester Co., Ltd.
*2 Determined according to the method described in ASTM-D1822
*3 Determined according to the method described in ASTM-F372
*4 Determined according to the method described in ASTM-D1525

What is claimed is:
1. A thermoformable resin laminate sheet comprising:
(a) a gas permeation-resistant resin layer;

(b) on each side of the gas permeation-resistant resin layer, a polyolefin based resin layer laminated on the gas permeation-resistant layer through an adhesive layer, said polyolefin based resin layer comprising a mixture of 35–70% by weight, based on the weight of the mixture, of at least one inorganic filler selected from the group consisting of talc and calcium carbonate and a resin selected from the group consisting of a polypropylene resin, a mixture of a polypropylene resin and an ethylene-propylene elastomer, and a mixture of a polypropylene resin and a polyethylene resin;

(c) on the outer surface of each polyolefin based resin layer, a thermoplastic resin layer free from inorganic filler and laminated on the outer surface of the polyolefin based resin layer, said thermoplastic resin being selected from the group consisting of a polypropylene resin, and a mixture of a polypropylene resin and a polyethylene resin.

2. A thermoformable resin laminate sheet according to claim 1 which has thickness of 200–2,000 μm.

3. A thermoformable resin laminate sheet according to claim 1 wherein the inorganic filler has a particle size of 20 μm or less.

4. A thermoformable resin laminate sheet according to claim 1 wherein the laminate is produced by coextrusion molding.

* * * * *